United States Patent Office 3,518,180
Patented June 30, 1970

3,518,180
BIPOLAR ELECTROLYTIC CELL
Morris P. Grotheer, Lewiston, N.Y., assignor to Hooker Chemical Corporation, Niagara Falls, N.Y., a corporation of New York
Filed Oct. 12, 1964, Ser. No. 403,104
Int. Cl. C22d 1/02; B01k 3/02
U.S. Cl. 204—268                                                9 Claims

ABSTRACT OF THE DISCLOSURE

A bipolar electrolytic cell for the production of chlorates and perchlorates is provided with non-porous, internally cooled bipolar electrodes interposed between two terminal monopolar electrodes which are connected to a source of direct current. The non-porous, internally cooled bipolar electrode comprises a cathode face and an anode face electrically connected by internally spaced ribs and an outer sealing rim. The internal ribs function as baffle means to direct the flow of coolant within the bipolar electrode, producing a minimum temperature differential across either face of the bipolar electrode.

---

This invention relates to an improved electrolytic cell for the production of chlorates and perchlorates. More particularly, this invention relates to a bipolar temperature controlled electrolytic cell and the method of producing chlorates and perchlorates thereby.

In the production of alkali metal chlorates and perchlorates, temperature control of the electrolyte is highly important in obtaining economical and efficient production. Anode consumption increases with increasing temperature and decreasing current efficiency. High temperatures are also unfavorable to chlorate and perchlorate formation. Low temperatures result in high voltages and poor power efficiencies but favor chlorate and perchlorate production. Therefore, desired electrolyte operating temperatures are usually a compromise, ranging from about 20 degrees centigrade to about 80 degrees centigrade. In an effort to increase current efficiencies and reduce electrode consumption, it is usually considered to be important to regulate the electrolyte temperature accurately and efficiently during chlorate and perchlorate production.

It is an object of this invention to provide an electrolytic cell having means for accurately regulating the cell temperature. Another object of this invention is to provide an electrolytic cell having internally cooled bipolar electrodes constructed so as to provide means for continuous operation and continuous flow of electrolyte through a series of bipolar units. A further object of this invention is to provide methods for continuously operating the internally cooled bipolar electrolytic cell of this invention at a gradient temperature so as to provide the most favored reaction conditions during the entire electrolytic process. These and other objects will become apparent to those skilled in the art from the description of the invention.

In accordance with this invention, an electrolytic cell for the production of chlorates and perchlorates is provided comprising a cell container having therein non-porous internally cooled bipolar electrodes interposed between two terminal monopolar electrodes which are connected to a source of direct current.

The present invention has numerous advantages over other electrolytic cells for the production of chlorates and perchlorates. Most chlorate and perchlorate cells provide some means for cooling the electrolyte. The means most often used are large exterior cooling tanks connected to the electrolytic cell to provide cooling by the recycle of electrolyte through the cell and back to the cooling tank, thereby maintaining the desired temperature. The present electrolytic cell does not require large cooling tanks or other cumbersome apparatus which occupies valuable plant area. The extensive cooling of all electrode surfaces eliminates hot spots and temperature variation from one electrode to another to thereby provide a uniformity in temperature control not previously obtained. The bipolar construction provides a means of incremental electrolysis as well as gradient temperature control. The present cell provides a means for continuous operation without the continuous recycle normally used in batch operations. In addition, the present invention provides a means of controlling the electrolyte in a series of cells so as to effect the most efficient production of the desired product. The present electrolytic cell makes possible the use of a greatly improved continuous process whereby less efficient batch-type processes may be eliminated.

The invention will be readily understood with reference to the drawing in which.

The electrolytic cell of the present invention utilizes one or more internally cooled bipolar electrodes 12 in normal operation. In a typical commercial operation, the electrolytic cell, assembly 10 of this invention, comprises a series of bipolar electrodes 12 contained within a single cell assembly 10. The number of bipolar electrodes 12 contained in the cell assembly 10 is limited only by practical considerations as to the total size of the assembly. Therefore, such a cell assembly 10 could readily comprise one to one hundred or more bipolar electrodes 12.

Figure 1:
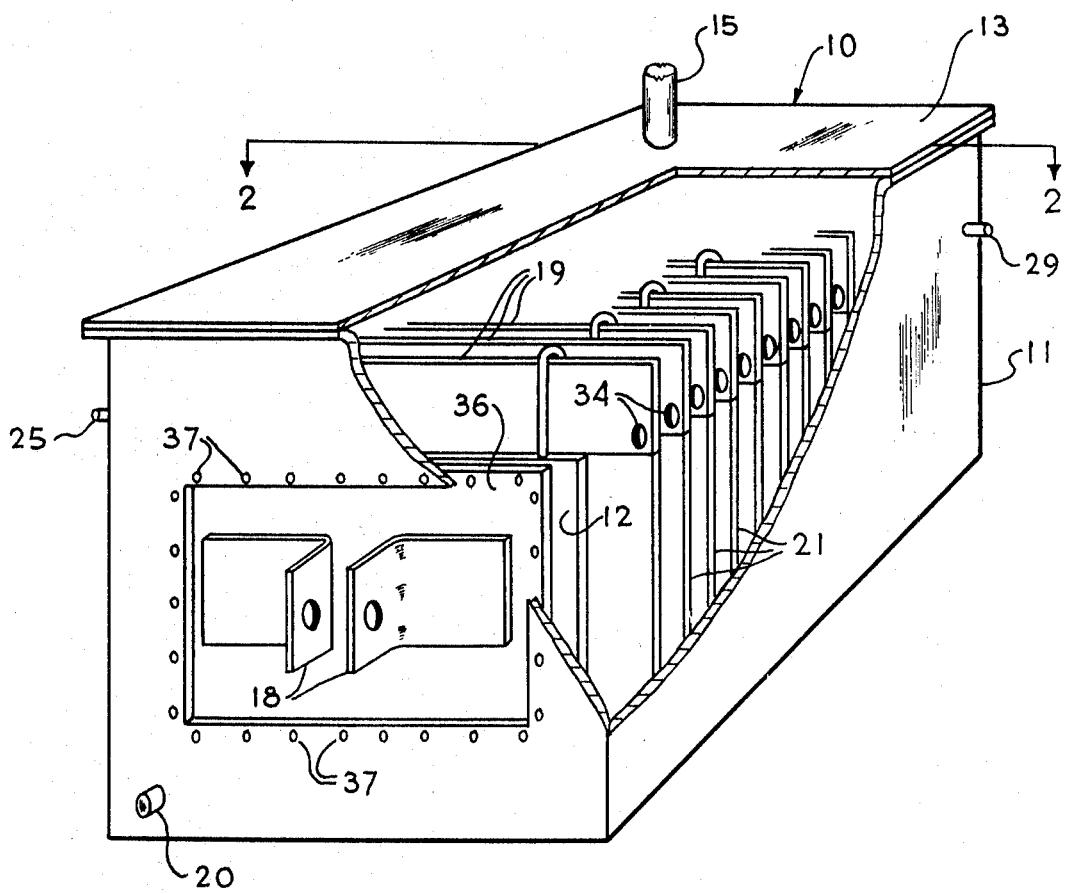
FIG. 1 is a perspective view of the cell assembly of this invention.
Figure 2:
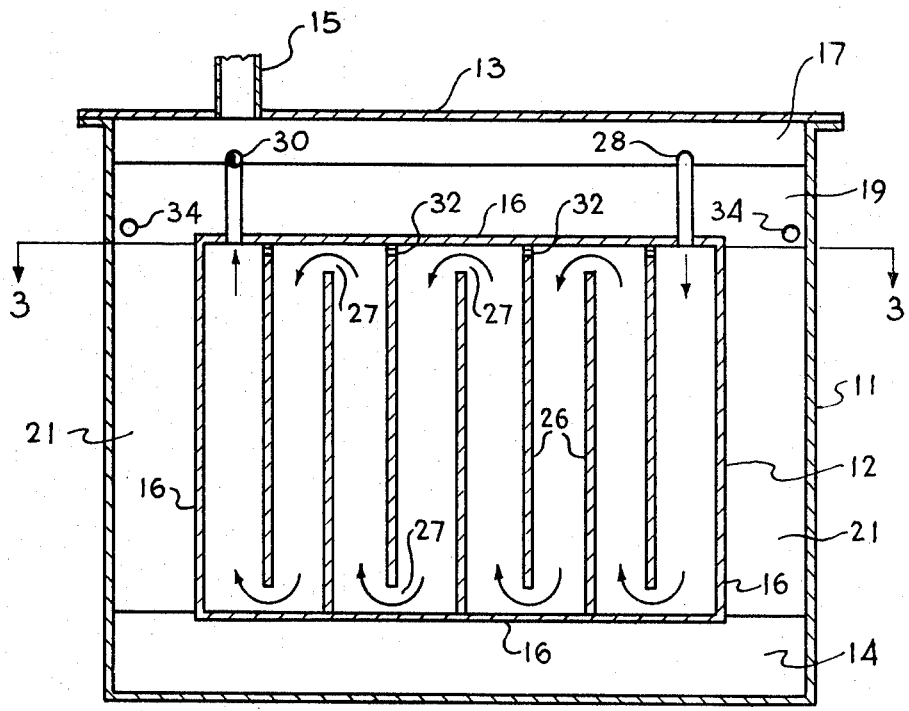
FIG. 2 is a vertical sectional view of the electrolytic cell assembly along 2—2 of FIG. 1, showing the internal structure of a bipolar electrode.
Figure 3:
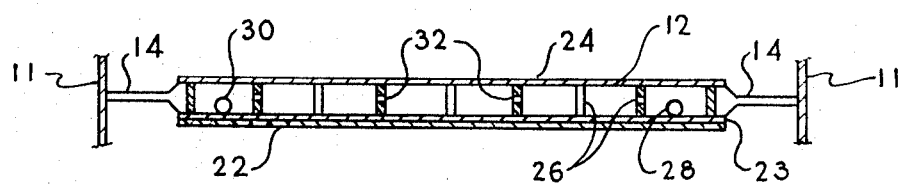
FIG. 3 is a horizontal sectional view of a bipolar electrode of FIG. 2 along 3—3.

Referring to the drawings, FIGS 1, 2 and 3 show the electrolytic cell assembly 10 and its various parts. The cell assembly 10 is enclosed by a water tight container 11 having a removable cell top 13 which fits securely over the container 11. Located in the cell top 13 is a gas outlet 15 through which cell gases are permitted to escape. Container 11 has a feed solution inlet 20 and outlet (not shown) in addition to a cooling liquid inlet 29 and outlet 25. Cell assembly container 11 and cell top 13 are constructed of inert, non-porous, nonconductive materials such as slate, ceramic, cement, or may also be constructed of metallic substances lined with polyvinyl chloride, polytetrafluoroethylene and the like inert plastic materials. Alternately, the cell assembly container can be constructed entirely of ridged inert and nonconductive plastic materials.

The cell assembly 10 comprises a number of bipolar electrodes 12. The bipolar electrodes 12 are located within the cell assembly container 11 in a space relationship to each other, held in place by spacers 14, 19 and 21. Spacers 19 are positioned above the bipolar electrodes 12 so as to prevent liquid flow over the top of electrodes 12 while permitting the passage of gases through space 17 and ultimately allowing the cell gases to escape to gas outlet 15. The electrolyte level is maintained below the height of the top of spacers 19. Spacers 14, 19 and 21 are attached to the cell assembly container 11, which rigidly hold bipolar electrodes 12 in position. Spacers 14, 19 and 21 are positioned so as completely to surround the exterior rim 16 of the bipolar electrodes 12 and form a water tight seal between the container 11 and the electrodes 12. Since spacers 14 also electrolytically isolate the individual bipolar electrodes 12 from each other, they are constructed of nonporous, nonconductive materials such as slate, ceramic, cement, rigid polyvinyl chloride, rigid polytetrafluoroethylene and the like, siliceous and plastic materials inert to the electrolytic and chemical conditions existing within the cell assembly.

In addition to the bipolar electrodes 12, the cell assembly 10 has terminal electrodes 36 at both ends of the cell assembly 10. The terminal electrodes 36 are monopolar electrodes which act respectively as anode and cathode during electrolysis. Bus bar 18 is directly attached to monopolar electrodes 36. Monopolar electrodes 36 are held in position by rivets or bolts 37 which permit removal of monopolar electrode 36.

Bipolar electrode 12 comprises an anode face 22 and a cathode face 24, the anode and cathode being preferably titanium or tantalum coated with platinum. Titanium or tantalum serves as a backing to supply the needed structural strength to the platinum face, thereby reducing the quantity of platinum required. The use of platinum on the face of both anode and cathode permits reversal of the current. Alternately, the cathode portion can be constructed of other electrically conductive metals such as copper, nickel, steel, silver, and the like metals and alloys thereof.

The exterior sealing rim 16 surrounding the bipolar electrode 12 is constructed of titanium, tantalum, or other suitable noncorrosive metals, whereas the internal ribs 26 may be constructed of titanium, tantalum, copper, nickel, silver, steel, and other conductive metals and alloys thereof which can be welded to an anode backing of titanium or tantalum. Since the internal ribs 26 are not subjected to severe chemical attack, they may be constructed of less corrosion-resistant metals than those required for the exposed faces.

The bipolar electrode 12 has an inlet 28 and an outlet 30 for circulating cooling liquid through the sealed interior space between the electrode faces. Ribs 26 are positioned so as to provide structural support, electrical connection, and to channel cooling liquid within the enclosed area throughout the entire interior of the bipolar electrode 12. Various designs can be used to facilitate the complete circulation of cooling liquids throughout the entire internal structure of the bipolar electrode. In the illustrated design, small holes 32 are provided at the upper extremities of ribs 26 to prevent the entrapment of air which may ultimately impair the cooling efficiency. Larger openings 27 are provided at alternating ends of ribs 26 so as to effect the flow of cooling liquid in the direction of the arrows shown in FIG. 2.

Cooling liquid such as water is normally used, but other heat transfer media, e.g., heating and cooling fluids, may also be used, such as heat transfer liquids and refrigerants, provided such media are relatively nonconductive.

The cooling liquid is passed through the bipolar electrodes individually or through several or all the cells connected in series. When connected in series, a graduated temperature throughout the cell assembly 10 is readily effected to provide the most economical operation of the cell. Cooling liquid connections are made using nonconductive tubing, such as tubing made of polyvinyl chloride, polytetrafluoroethylene, and similar plastic materials inert to the conditions within the cell.

To permit the flow of electrolyte from one bipolar electrode to another, the present cell assembly 10 is provided with openings 34 positioned in two widely separated locations on spacer 19. During operation, one of the openings 34, associated with each bipolar electrode 12, is plugged. The remaining opening is positioned with respect to the adjoining bipolar electrodes 12, in an alternate fashion so that the electrolyte flow is from one side to the other across the electrode face. The gas evolution from the electrodes causes a rolling action which draws incoming liquid downwardly from the upper part of the electrode face. Alternatively, the opening can be positioned in other locations on the spacers surrounding the bipolar electrodes.

Figure 4:
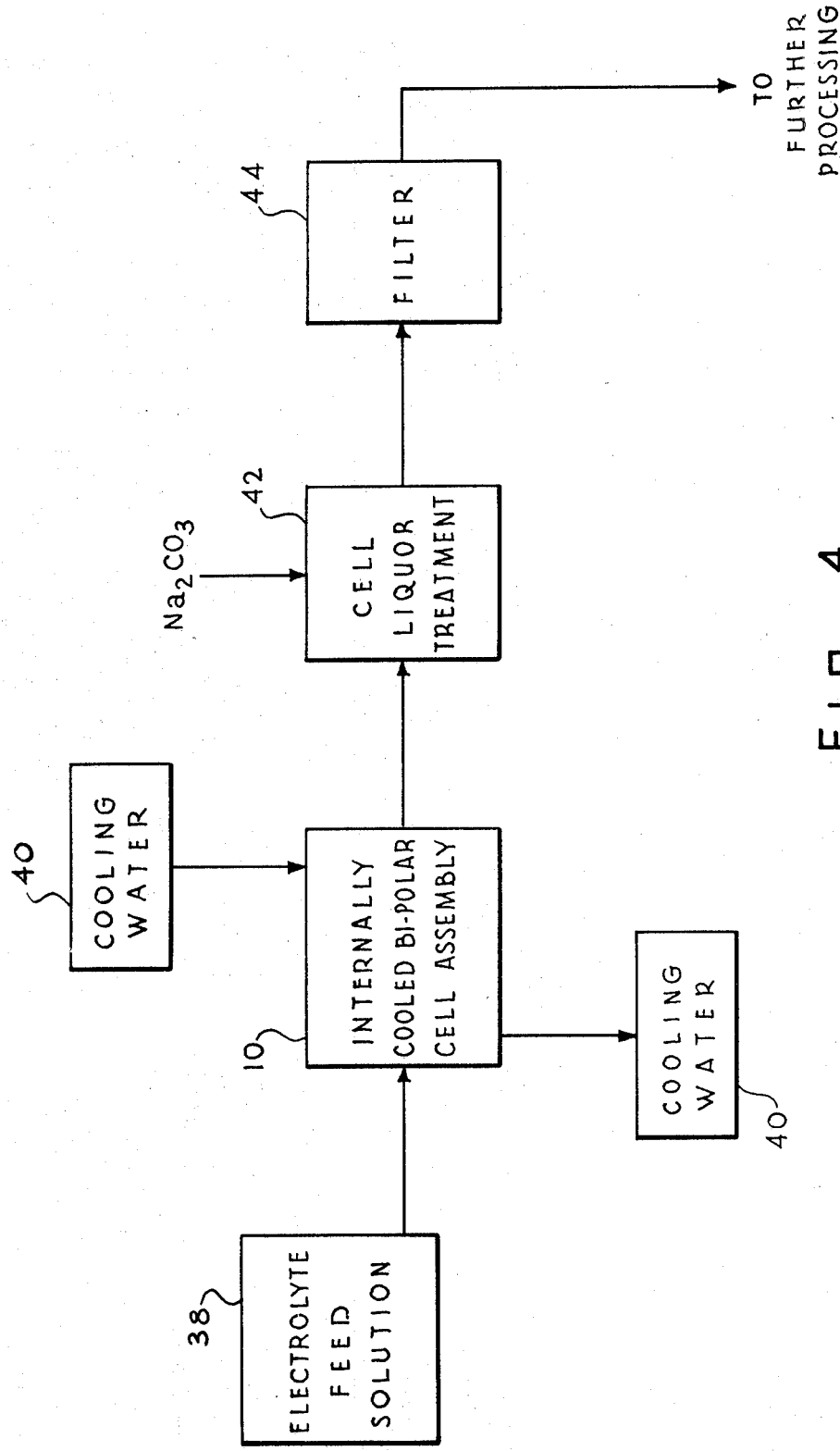
FIG. 4 is a flow sheet of a continuous process for the production of chlorates and perchlorates using the electrolytic cell of this invention.
Figure 5:
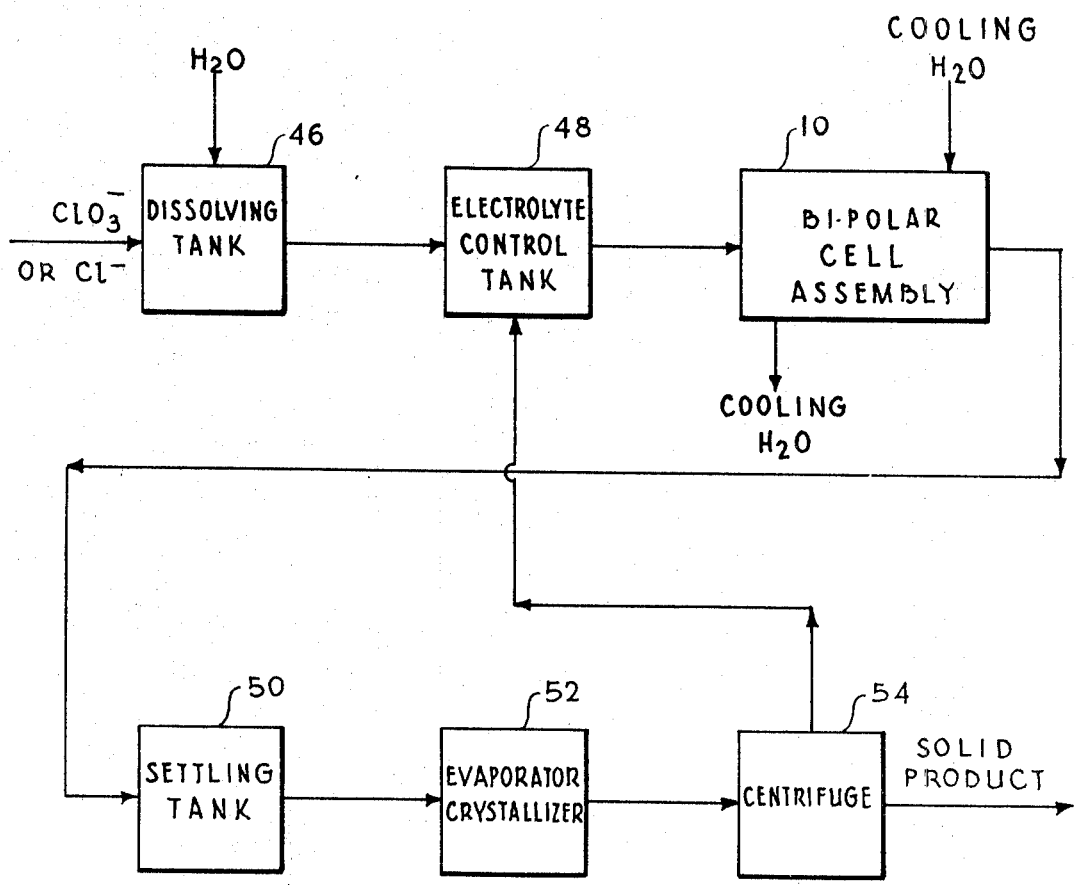
FIG. 5 is another flow sheet illustrating another continuous process for the production of chlorates and perchlorates using an electrolytic cell of the present invention.

FIGS. 4 and 5 are flow sheets showing processes particularly suited for use with the electrolytic cell assembly of the present invention. FIG. 4 illustrates a continuous process wherein alkali metal chlorates and perchlorates are electrolyzed from alkali metal chloride and alkali metal chlorate solution, respectively, in a continuous manner without recycling partially electrolyzed feed liquor as often required in batch-wise productions. Electrolyte feed solution 38, such as aqueous sodium chloride, potassium chloride or sodium chlorate, at a concentration of about 200 to 1000 grams per liter, is continuously fed into the bipolar cell assembly 10 of the present invention. The bipolar electrodes of the cell assembly are internally cooled by cooling water 40 to maintain an electrolyte temperature in the range of 20 degrees centigrade to 80 degrees centigrade. During cell operation, a decomposition voltage is passed through the cell assembly to effect the production of chlorates or perchlorates.

The solution exiting from the cell assembly 10 is composed of about 200 to 1150 grams per liter of product, and 5 to 25 grams per liter of unreacted feed product. When the feed solution is an alkali metal chloride salt solution, the product is an alkali metal chlorate. When the feed solution is an alkali metal chlorate solution, the product is an alkali metal perchlorate solution.

The product solution is optionally passed to an alkali metal carbonate treatment and barium chloride treatment to remove calcium inpurities as calcium carbonate and chromate ions as barium chromate. The alkali metal carbonate treatment can be eliminated when the spacers are plastic and the cell assembly container is internally lined with an inert plastic material such as polyvinyl chloride or polytetrafluoroethylene. Such an inert liner eliminates the leaching of calcium salts from siliceous container materials.

Following the alkali metal carbonate barium chloride treatment 42, the product solution is filtered 44 and subsequently sent for further processing, such as converting sodium perchlorate to ammonium perchlorate, or the separation of the chlorate or perchlorate from solution.

Using the continuous process as described, the flow rate through the bipolar cell assembly and the number of bipolar cells contained therein is regulated in accordance with the current density and the cell efficiency so as to produce a high concentration of electrolyzed product and low concentration of unreacted product in a single pass through the cell assembly. It has been found that excellent results are obtained using 30 to 80 bipolar electrodes in the cell assembly, operating at an average current of 1800 to 4000 amps. and a flow rate of 0.5 to about 4 gallons feed solution per minute. Such figures are dependent largely upon the capacity of the cells and can reasonably be expected to be greater or less for cell assemblies of varying capacities.

FIG. 5 is a flow sheet of another continuous process for the production of chlorates and perchlorates using the electrolytic cell of the present invention. The process illustrated is continuous with a partial recycle of the cell liquor. This process is geared primarily to the production of alkali metal chlorates and perchlorates in solid form rather than as a solution.

In the production of alkali metal chlorates and perchlorates, a solution of alkali metal chloride or alkali metal chlorate and water is prepared in dissolving tank 46 and subsequently fed to electrolyte control tank 48 wherein the prepared chlorate solution is mixed with liquors returning from centrifuge 54. The centrifuge liquors contain varying amounts of both reacted and unreacted product, depending on the various conditions used to crystallize the product from solution prior to entering centrifuge 54. In the production of perchlorates, the feed solution leaving the electrolyte control tank 48 and entering the bipolar cell assembly 10 is a mixture of 100 to 500 grams per liter of alkali metal chlorate and 300 to 800 grams per liter alkali metal perchlorate. In the production of chlorates, the feed solution comprises 100 to 500 grams per liter alkali metal chloride and 300 to 800 grams per liter alkali metal chlorate.

The feed solution is passed through the bipolar cell assembly 10 in a controlled rate, while a decomposition voltage is passed through the cell assembly 10. Cooling liquid is passed through the internal structure of the bipolar electrodes to effect a controlled temperature of the feed liquor.

The temperature of the electrolyte is preferably regulated in the range of 20 degrees centigrade to 80 degrees centigrade and is more preferably controlled gradientwise so as to have the coolest temperatures when the end product content is the highest. In actual use, the temperature is normally gradiented, a higher temperature being in that portion of the cell assembly where the feed liquor first enters and the lower temperature being the exit temperature of the feed liquor.

On passing the feed liquor through the bipolar cell assembly 10, at least a portion of the feed solution is oxidized, thereby increasing the concentration of desired product in the cell liquor. A typical change in composition would be an exiting cell liquor composition of 50 to 150 grams per liter of unreacted material and 800 to 1200 grams per liter of end product.

The liquor withdrawn from bipolar cell assembly 10 is passed to settling tank 50 for removal of solids and temporary storage. From settling tank 50 the liquor is routed to evaporator and crystallizer 52 wherein the liquor is concentrated by evaporating some of the water and effecting a crystallization of the end product. The resulting slurry of crystallized product and liquor is sent to centrifuge 54 wherein the crystallized product is removed. The remaining liquor is returned to electrolyte control tank 48 for recycle.

The described process is particularly effective in that a low concentration of unreacted product does not have to be achieved for efficient operation since the unreacted product is recycled for further reaction.

This process is effective for the production of chlorates from brine solutions as well as perchlorates from chlorate solutions.

The following examples illustrate certain preferred embodiments of the present invention. Unless otherwise indicated, all parts and percentages used herein are by weight and all temperatures in the examples and claims are in degrees centigrade unless otherwise indicated.

EXAMPLE 1

The process of FIG. 4 was operated using the cell assembly and internally cooled bipolar cells of FIG. 1 to produce sodium perchlorate from sodium chlorate. The cell assembly was composed of 45 bipolar cells having platinum coated titanium anodes and cathodes. The bipolar cells were internally cooled with water, the cooling water being connected in series so as to obtain an electrolyte temperature of 60 degrees centigrade near the electrolyte inlet in the cell assembly and 30 degrees centigrade near the electrolyte outlet in the cell assembly. An aqueous chlorate solution having a concentration of 650 grams per liter sodium chlorate and 1 gram per liter sodium dichromate was fed to the bipolar cell assembly at a rate of 1.54 gallons per minute. A decomposition voltage was passed through the bipolar cell assembly amounting to 2500 amps. The cell liquor passing through the bipolar cell assembly was electrolyzed to perchlorate resulting in a final concentration of 700 grams per liter sodium perchlorate and 25 grams per liter sodium chlorate.

The cell liquor exiting from the bipolar cell assembly was treated with sodium carbonate and barium chloride to precipitate solubilized calcium salts and chromate ions.

The filtered solution yielded a relatively pure solution of 700 grams per liter sodium perchlorate and 25 grams per liter sodium chlorate. This product was then in condition for further processing, such as the conversion to ammonium perchlorate.

EXAMPLE 2

Sodium perchlorate was produced using the apparatus and the process of this invention as illustrated in FIG. 1 and FIG. 5. The bipolar cell assembly comprised 45 bipolar cells contained in a polyvinyl chloride lined concrete cell container. This cell, when operated at 2260 amps had a production capacity of 5.55 tons sodium perchlorate per day at a flow rate of electrolyte through the cell equal to 2.32 gallons per minute.

The bipolar cell units were constructed of an anode of platinum coated titanium and a cathode of copper.

The electrolyte temperature was controlled by circulation of water through the internal structure of the bipolar unit with the bipolar units connected in series so as to produce a graduated temperature throughout the bipolar cell assembly as in Example 1. The temperature was controlled at a minimum of 30 degrees and a maximum of 60 degrees centigrade. An aqueous sodium chlorate solution was prepared in the dissolving tank and subsequently added to the diluting tank at a rate so that, in combination with the recycled liquor, the feed solution had a concentration of 300 grams per liter sodium chlorate and 700 grams per liter sodium perchlorate. The feed rate to the bipolar cell assembly was adjusted to 2.32 gallons per minute. A decomposition voltage was passed through the bipolar cell assembly at a current of 2260 amps. The cell liquor exiting from the bipolar cell assembly had a composition of 80 grams per liter sodium chlorate and 1100 grams per liter sodium perchlorate. This liquor was passed to a settling tank for temporary storage.

In that the bipolar cell assembly was internally lined with polyvinyl chloride, it was not necessary to treat the product solution with chemicals to remove solubilized calcium salts. The product solution in the cell was in a relatively pure state.

From the settling tank, the product solution was passed to the evaporator and crystallizer where a portion of the water was evaporated to effect the crystallization of sodium perchlorate. The resulting slurry was passed to a centrifuge to expedite the removal of the sodium perchlorate crystals. The filtrate contained substantial proportions of sodium chlorate and sodium perchlorate. This liquor was recycled to the electrolyte control tank for further processing.

The processes described in Examples 1 and 2 were repeated using varying flow rates, feed concentrations and varying numbers of bipolar electrodes. Both chlorates and perchlorates were produced by these methods. Also, the internally cooled bipolar electrodes were cooled individually as well as in groups resulting in complete control of electrolyte temperature over a wide range.

From the description of the electrolytic cell of the present invention and the processes therefor, it is readily seen that the present electrolytic cell has uses other than for the production of chlorates and perchlorates. Such other uses include electrolytic oxidations or reductions of pharmaceutical products and other organic compounds, and for use as periodic acid cells and chromic acid regeneration cells.

While there have been described various embodiments of the invention, the apparatus and methods described are not intended to limit the scope of the invention, as it is realized that changes therein are possible within the invention. It is further intended that each element recited in any of the following claims is to be understood as referring to all equivalent elements for accomplishing substantially the same results in substantially the same or equivalent manner. It is intended to cover the inven-

What is claimed is:
1. An electrolytic cell comprising a cell container having therein disposed at least one bipolar electrode interposed between terminal monopolar electrodes connected to a source of direct current, said bipolar electrode comprising an anode and a cathode, said anode lying in a plane essentially parallel to said cathode, said anode and cathode being electrically connected by a continuous sealing rim about the periphery of said electrode to provide an internal chamber and internal ribs extending substantially perpendicularly from the plane of said anode and cathode between the internal surfaces of said electrode, said ribs providing a circulation channel for a heat transfer medium.

2. The electrolytic cell of claim 1 in which said bipolar electrode comprises a unitary electrode-spacer means assembly in which said spacer extends from the rim of said electrode to the side of said cell to form a rigid, fluid-tight seal between the electrode and the container walls while providing an extension above said electrode to prevent liquid flow over the top of the electrode, said spacer being provided with electrolyte flow means.

3. The electrolytic cell of claim 2 in which said electrolyte flow means comprises an orifice extending through said spacer means at a point above the active surface of said anode and cathode.

4. The electrolytic cell of claim 3 in which said electrolyte flow means are placed serially at opposite sides of the electrolytic cell container.

5. The electrolytic cell of claim 1 in which said bipolar electrode is an internally cooled, non-porous, metallic electrode having an anode and cathode of platinum coated over a metal selected from the group consisting of titanium and tantalum.

6. The electrolytic cell of claim 1 wherein the bipolar electrode has an anode of platinum coated over a metal selected from the group consisting of titanium and tantalum and a cathode of a metal selected from the group consisting of copper, nickel, steel and alloys thereof.

7. The electrolytic cell of claim 1 in which said bipolar electrodes are provided with inlet means and outlet means for passage of a heat transfer medium.

8. The electrolytic cell of claim 1 in which said bipolar electrodes are provided with interconnecting conduits for the passage of heat transfer medium in continuous manner from one electrode to another.

9. An electrolytic cell for the production of chlorates and perchlorates comprising a cell container having therein disposed plural, non-porous, internally cooled bipolar electrodes interposed between two terminal monopolar electrodes which are connected to a source of direct current, said bipolar electrodes comprising an anode and a cathode, said anode lying in a plane essentially parallel to said cathode, said anode and cathode being electrically connected by a continuous peripheral sealed rim to provide an internal chamber and plural internal ribs, said ribs being disposed perpendicularly from the plane of said anode and cathode in such manner as to provide a baffled circulation path for a heat transfer medium traversing the internal region of said bipolar electrode from an inlet means to an outlet means, said bipolar electrode being rigidly spaced from an adjacent bipolar electrode by spacer means extending from the peripheral sealed rim of said electrode to form a fluid-tight connection with the side-walls and bottom of said cell container, said spacer extending from the upper sealed rim of said bipolar electrodes being provided with an orifice through which electrolyte flows.

References Cited
UNITED STATES PATENTS

| | | | |
|---|---|---|---|
| 892,983 | 7/1908 | Digby | 204—95 |
| 2,515,614 | 7/1950 | Schumacher | 204—274 |
| 2,756,201 | 7/1956 | Müller | 204—95 |
| 2,868,711 | 1/1959 | Karr | 204—274 |
| 3,298,946 | 1/1967 | Forbes | 204—268 |
| 3,316,167 | 4/1967 | Clarke et al. | 204—268 |

JOHN H. MACK, Primary Examiner

H. M. FLOURNOY, Assistant Examiner

U.S. Cl. X.R.

204—95